US005564590A

United States Patent [19]
Kim

[11] Patent Number: 5,564,590
[45] Date of Patent: Oct. 15, 1996

[54] COOKING VESSEL HAVING MULTIPLE BOTTOM STRUCTURE AND METHOD FOR PRODUCTION THEREOF

[76] Inventor: Myung-Suk Kim, Hyundae Apartment 112-603, 297, Abgujeong-Dong, Kangnam-Ku, Seoul, Rep. of Korea

[21] Appl. No.: 267,869

[22] Filed: Jun. 28, 1994

[30] Foreign Application Priority Data

Apr. 21, 1994 [KR] Rep. of Korea .................. 94-8467

[51] Int. Cl.$^6$ ...................................................... B65D 6/28
[52] U.S. Cl. .................. 220/626; 220/442; 220/443; 220/912; 220/453; 126/375; 126/390
[58] Field of Search .................................. 220/626, 442, 220/443, 453, 912; 126/375, 390

[56] References Cited

U.S. PATENT DOCUMENTS

| | | | |
|---|---|---|---|
| 3,017,492 | 1/1962 | Jepson | 126/390 X |
| 4,204,607 | 5/1980 | Zani | 126/390 X |
| 4,596,236 | 6/1986 | Eide | 126/390 |
| 4,614,852 | 9/1986 | Matsushita et al. | 126/390 X |
| 5,064,055 | 11/1991 | Bessenbach et al. | 22/626 |

Primary Examiner—Stephen K. Cronin
Attorney, Agent, or Firm—Nawrocki, Rooney & Sivertson, P.A.

[57] ABSTRACT

A cooking vessel having a multiple bottom structure. The cooking vessel strengthens the structure of a bottom plate, made of copper, copper alloy, aluminum or aluminum alloy, by simple insertion of a reinforcing member on the bottom plate. The reinforcing member is made of a ferrous metal or a nonferrous metal different from the material of the bottom plate. With the difference of heat conduction between the bottom plate and the reinforcing means made of different materials, the heat transfer rate, the heat conductivity and the heat preservation of the vessel bottom are remarkably improved. When the reinforcing member is magnetized, the cooking vessel can be used with an induction heater. The reinforcing member is inserted in the bottom plate such that its bottom is leveled with a bottom surface of the bottom plate. In production of the cooking vessel, the bottom plate is preheated to temperatures ranged from 470° C. to 490° C. and, thereafter, the reinforcing member is pressed down onto the bottom of the bottom plate using instantaneous pressures ranged from 1000 to 1300 ton, thus to be inserted into the bottom plate.

5 Claims, 7 Drawing Sheets

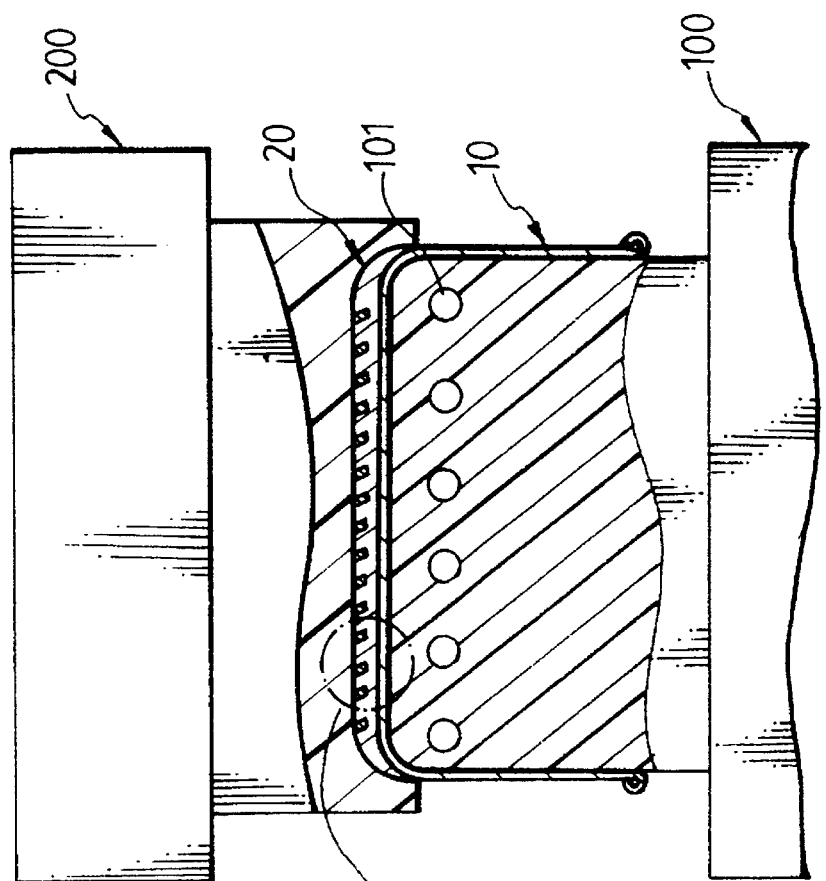
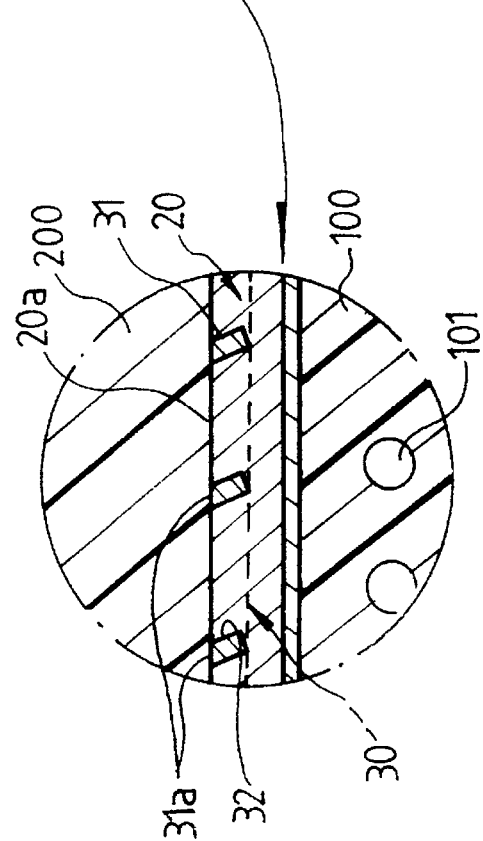
FIG. 6

COOKING VESSEL HAVING MULTIPLE BOTTOM STRUCTURE AND METHOD FOR PRODUCTION THEREOF

BACKGROUND OF THE INVENTION

1. Field of the Invention

The present invention relates in general to metallic cooking vessels such as pans and pots and, more particularly, to a stainless steel cooking vessel whose base bottom is added, using a pressing device such as a friction press or a high-frequency heating device, with a copper, copper alloy, aluminum or aluminum alloy bottom plate for improving its heat transfer rate.

2. Description of the Prior Art

Conventionally, a metallic cooking vessel such as a fry pan or a stew pot is mainly made of a stainless steel suitable for keeping the vessel from rusting. The base bottom or a stainless steel base bottom of such a cooking vessel is preferably added with a copper, copper alloy, aluminum or aluminum alloy bottom plate on its outer surface for improving its heat transfer rate. An additional stainless plate is joined to the outer surface of the bottom plate for forming an outermost bottom layer of the cooking vessel. This outermost bottom layer prevents possible damage and possible rust of the frail bottom plate. The joining of the additional stainless steel plate to the bottom plate may be achieved by a pressing device such as a friction press using instantaneous pressure. Alternatively, the joining of the additional stainless steel plate to the bottom plate may be achieved by high-frequency heating using a solvent such as powder or flux. Hence, the above cooking vessel has a triple bottom structure comprising the stainless steel base bottom, the bottom plate added to the base bottom and the additional stainless steel plate joined to the bottom plate. In this regard, the above cooking vessel is named as a triple bottom structure cooking vessel.

However, such a cooking vessel having the triple bottom structure uneconomically wastes the copper, copper alloy, aluminum or aluminum alloy for the bottom plate and this causes increase of the cost.

The above cooking vessel should be used with specified heating devices, so that it is inevitably limited in its use.

The outermost bottom surface of the cooking vessel or the outer surface of the additional stainless steel plate is formed of the same material, that is, the stainless steel, and shows a simple flat surface. This cooking vessel thus has a bad heat reception structure at its bottom due to the flat bottom surface. In this regard, when the vessel is laid on and heated by a heating device such as a gas range, the flames of the heating device contact with and heat the flat bottom surface of the vessel and in turn pass by the bottom corner of the vessel in order to disappear into the atmosphere. This causes considerable heat loss and waste of fuel. Furthermore, the flames of the heating device heat intensively the single-layered bottom corner of the cooking vessel while passing by this bottom corner, so that the food in the vessel gets partially scorched about and sticks to the bottom corner.

Since the outer bottom of the above cooking vessel is made of the same material and has a simple flat surface, the vessel shows no good outer appearance when it is not used but kept turned over. The bad outer appearance of the bottom surface deteriorates value of the vessel.

SUMMARY OF THE INVENTION

It is, therefore, an object of the present invention to provide a stainless steel cooking vessel having a multiple bottom structure in which the aforementioned problems can be overcome and whose bottom is added with a copper, copper alloy, aluminum or aluminum alloy bottom plate including reinforcing means for improving the structural strength of the copper, copper alloy, aluminum or aluminum alloy bottom plate, the heat transfer rate, the heat conductivity and the heat preservation of the vessel bottom.

It is another object of the present invention to provide a method for production of the above stainless steel cooking vessel.

In order to accomplish the primary object, a stainless steel cooking vessel in accordance with the present invention comprises: a stainless steel base body; a bottom plate joined to an outer bottom of the stainless steel base body, the bottom plate being made of a material selected from the group of copper, copper alloy, aluminum and aluminum alloy; and reinforcing means added to the bottom plate for improving not only a structural strength of the bottom plate but also heat transfer rate, heat conductivity and heat preservation of a vessel bottom, the reinforcing means having a heat conduction different from that of the material of the bottom plate and being inserted in the bottom plate such that its bottom is leveled with a bottom surface of the bottom plate.

In order to accomplish the second object, a method for production of a stainless steel cooking vessel in accordance with the present invention comprises: joining a bottom plate made of copper, copper alloy, aluminum or aluminum alloy to an outer bottom of a stainless steel vessel body and reversely laying the stainless steel vessel on a lower mold of a friction press; preheating the bottom plate to temperatures ranged from 470° C. to 490° C.; and pressing down a reinforcing means, made of a ferrous metal or a nonferrous metal and having an opening, onto a bottom of the bottom plate using instantaneous pressures ranged from 1000 to 1300 ton, thus to insert the reinforcing means into the bottom plate until a bottom of the reinforcing means is leveled with the bottom of the bottom plate.

BRIEF DESCRIPTION OF THE DRAWINGS

The above and other objects, features and other advantages of the present invention will be more clearly understood from the following detailed description taken in conjunction with the accompanying drawings, in which:

FIGS. 5 and 6 are views showing an instantaneous pressing operation for production of the cooking vessel of the present invention, in which:

FIG. 5 is a view showing a step for positioning the stainless steel vessel on a lower mold of a friction press before pressing; and FIG. 6 is a view showing a pressing step;

FIGS. 9A to 9D are bottom views of cooking vessels in accordance with other embodiments of the present invention respectively, in which:

FIG. 9A shows a cooking vessel having a diamond mesh type net member as the reinforcing means;

FIG. 9B shows a cooking vessel having a honeycomb type net member as the reinforcing means;

FIG. 9C shows a cooking vessel having a smooth spiral member as the reinforcing means; and FIG. 9D shows a cooking vessel having an angled spiral member as the reinforcing means.

DESCRIPTION OF THE PREFERRED EMBODIMENTS

Figure 1:
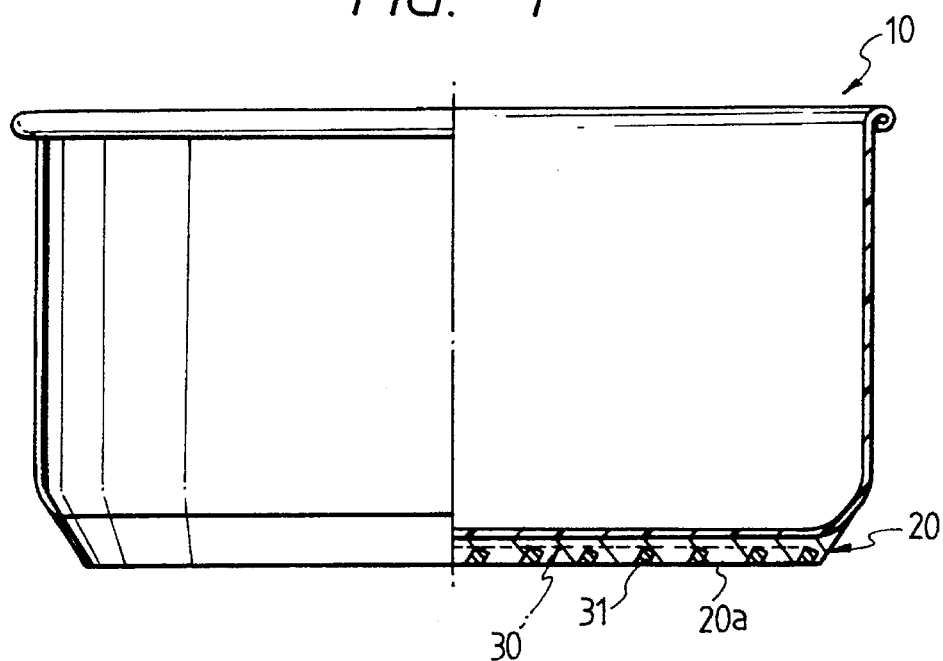
FIG. 1 is a sectioned view of a cooking vessel in accordance with a primary embodiment of the present invention.
Figure 2:
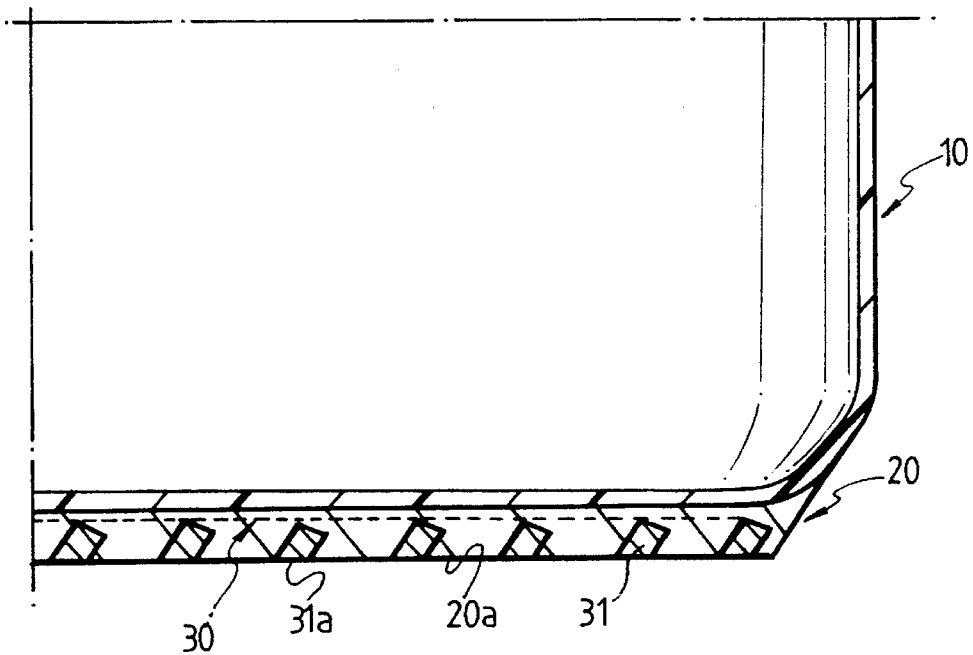
FIG. 2 is a partially enlarged sectional view of the cooking vessel of FIG. 1.
Figure 3:
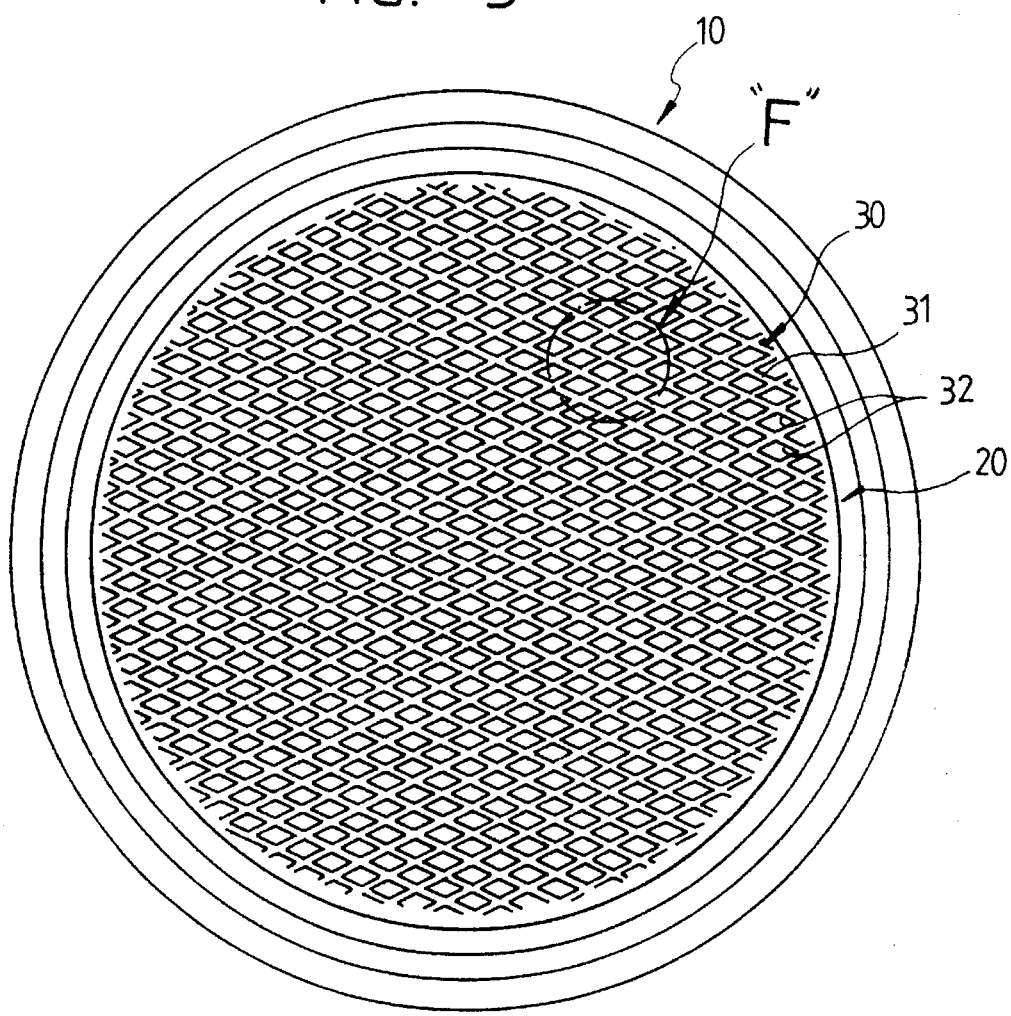
FIG. 3 is a bottom view of the cooking vessel of FIG. 1.
Figure 4:
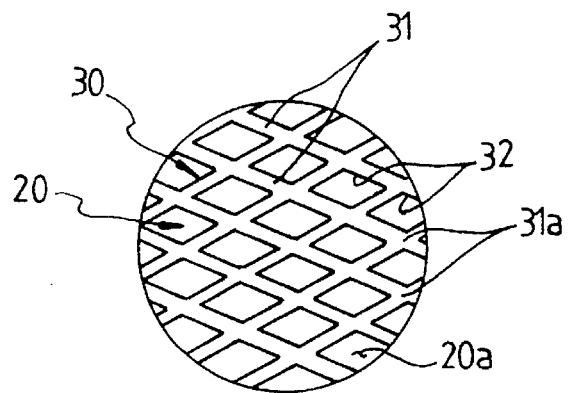
FIG. 4 is an enlarged view of the circled section F of FIG. 3, showing the structure of a net member used as reinforcing means of a bottom plate.

Referring to FIGS. 1 to 4, there is shown a cooking vessel in accordance with a primary embodiment of the present invention. That is, FIG. 1 is a sectioned view of the cooking vessel, FIG. 2 is a partially enlarged sectional view of the cooking vessel, FIG. 3 is a bottom view of the cooking vessel and FIG. 4 is an enlarged view of the circled section F of FIG. 3 for showing the structure of a net member used as reinforcing means of a bottom plate. As shown in the drawings, the cooking vessel 10 comprises a stainless steel base body and, at the lower end of a bottom portion of the cooking vessel 10, a copper, copper alloy, aluminum or aluminum alloy bottom plate 20. The bottom plate 20 defines an outer bottom surface of the bottom portion of the cooking vessel 10 and provides for improvement of the heat transfer rate of the vessel bottom portion. In accordance with the present invention, the bottom plate 20 is in turn added with the reinforcing means for improving the structural strength of the bottom plate 20, the heat transfer rate, the heat conductivity and the heat preservation of the vessel bottom. In the primary embodiment of FIGS. 1 to 4, a circular net member 30 as the reinforcing means is inserted into the outer bottom of the bottom plate 20. The insertion of the net member 30 into the plate 20 is achieved by pressing. This net member 30 is formed by crossing a plurality of jagged ribs 31. The jagged ribs 31 are made of a material different from the material of the bottom plate 20. Each mesh 32 of net member 20 defined by the jagged ribs 31 shows a diamond shape. When inserting the net member 30 into the lower bottom of the plate 20, this net member 30 is laid on the bottom surface of the plate 20 and instantaneously pressed down to the plate 20. As a result of the pressing, the net member 30 eats into the plate 20. At this time, the pressing is continued until peaks 31a of the jagged ribs 31 of the net member 30 are leveled with the bottom surface 20a of the plate 20. Here, the bottom surface 20a of the plate 20 is formed by the material of the plate 20 which tightly fills up the diamond meshes 32 of the net member 30 when the net member 30 eats into the plate 20.

In the primary embodiment, the net member 30 is formed in a single body. It is preferred to form the net member 30 using a stainless steel. Alternatively, the net member 30 may be formed of copper showing a high heat conductivity. Since the ribs 31 of the net member 30 are jagged as described above, it slantly eats into the bottom of the plate 20 when the net member 30 is vertically pressed down onto the bottom of the plate 20 by the press. This slant eating of the ribs 31 into the plate 20 facilitates insertion of the net member 30 into the plate 20. With the net member 30 tightly eating into the bottom plate 20, a desired structural strength of the bottom plate 20 is achieved irrespective of intrinsic frailness of the copper, copper alloy, aluminum or aluminum alloy of the plate 20.

There is a difference of heat conduction between the bottom plate 20 and the net member 30 when the two elements 20 and 30 are made of different materials. Hence, the heat transfer rate, the heat conductivity and the heat preservation of the bottom portion of the vessel 10, are remarkably improved. In this regard, the cooking time as well as the fuel consumption of the cooking vessel 10 is remarkably reduced when this cooking vessel 10 is laid on and heated by a conventional heating device such as a gas range.

When the bottom plate 20 is made of the aluminum or aluminum alloy and the net member 30 is made of copper showing the high heat conductivity, the cooking vessel 10 economically saves the fuel and achieves the recent trend of energy saving. Meanwhile, when the net member 30 is made of a stainless steel, the heat transferred to the member 30 is reliably preserved for a long time by the bottom plate 20 tightly surrounding the member 30, so that the vessel 10 shows an excellent heat preservation.

As well known to those skilled in the art, the bottom plate 20 can not be magnetized due to the characteristics of its material. In this regard, a cooking vessel whose bottom is only added with the bottom plate 20 can not be used with an induction heater. However, when the net member 30 is magnetized and inserted into the bottom plate 20 of the vessel 10, this vessel 10 can be used with such an induction heater and this makes the vessel 10 having many uses.

Turning to FIGS. 7, 8 and 9A to 9D, there are shown bottom structures in accordance with other embodiments of the present invention.

Figure 7:
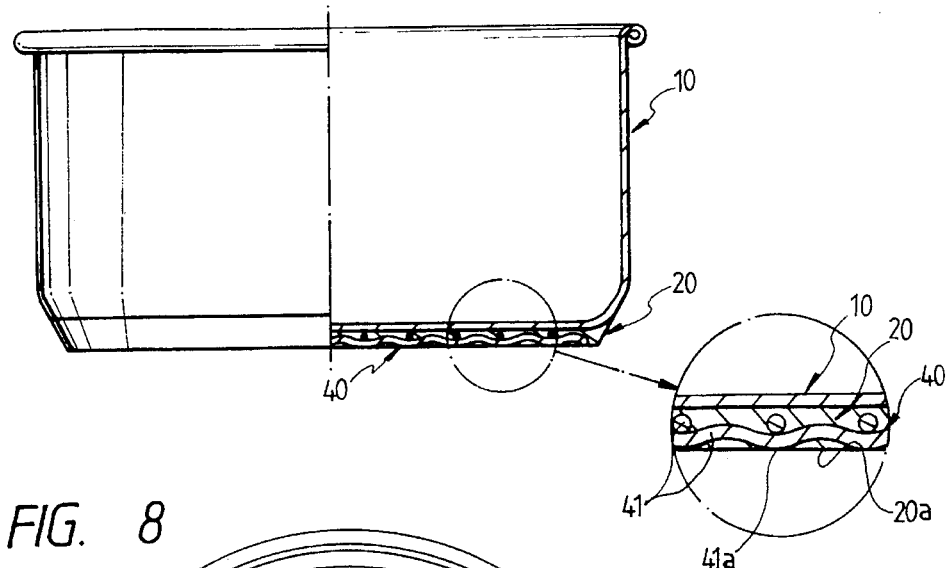
FIG. 7 is a sectioned view of a cooking vessel in accordance with a second embodiment of the present invention.
Figure 8:
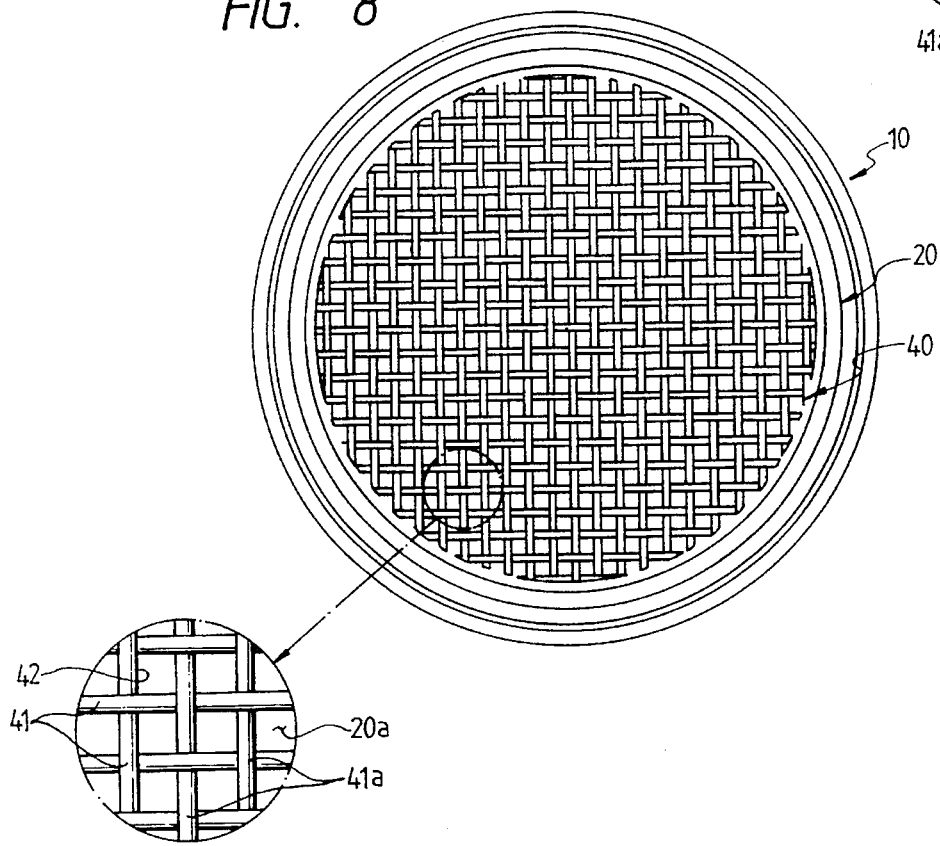
FIG. 8 is a bottom view of the cooking vessel of FIG. 7.

FIGS. 7 and 8 show a stainless steel cooking vessel having a bottom structure in accordance with a second embodiment of this invention. In this second embodiment, the reinforcing means inserted in the bottom plate 20 comprises a net member 40 having rectangular meshes 42. The net member 40 is formed by conventional netting of a plurality of steel wires 41. When inserting the net member 40 into the bottom plate 20 by pressing the member 40 onto the bottom plate 20, this net member 40 eats into the bottom plate 20 such that the peaks 41a of the wave steel wires 41 are leveled with the bottom surface 20a of the plate 20. In this second embodiment, each of the steel wires 41 has a circular cross-section. However, it should be understood that each steel wire 41 may have another cross-section such as a rectangular cross-section.

Figure 9A:
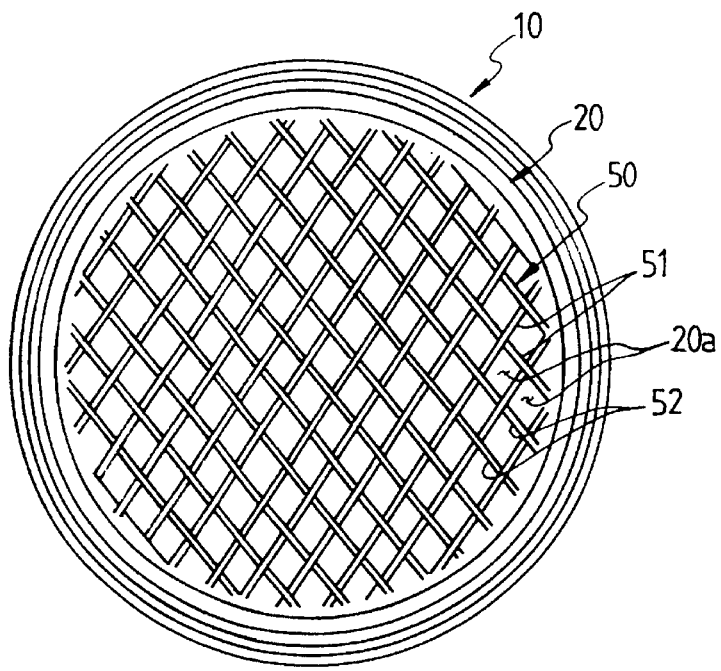

FIG. 9A is a bottom view of a cooking vessel 10 according to a third embodiment of this invention. In this third embodiment, the reinforcing means inserted in the bottom plate 20 comprises a net member 50 having diamond meshes 52. The net member 50 of this embodiment is formed by conventional netting of a plurality of steel wires 51. In the same manner as described for the net member 40, this net member 50 eats into the bottom plate 20 such that the peaks of the wave wires 51 are leveled with the bottom surface 20a of the plate 20.

Figure 9B:
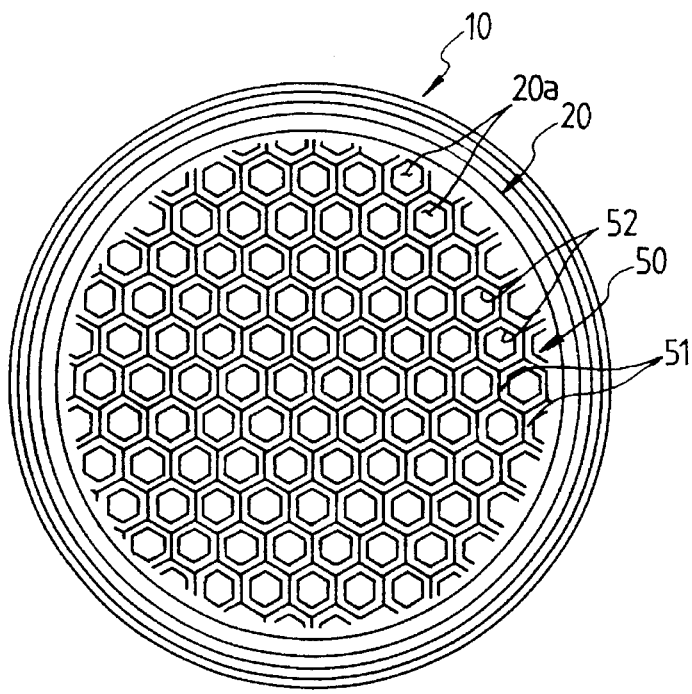

As shown in FIG. 9B, the reinforcing means of the cooking vessel 10 may comprise a honeycomb type net member 50.

Figure 9C:
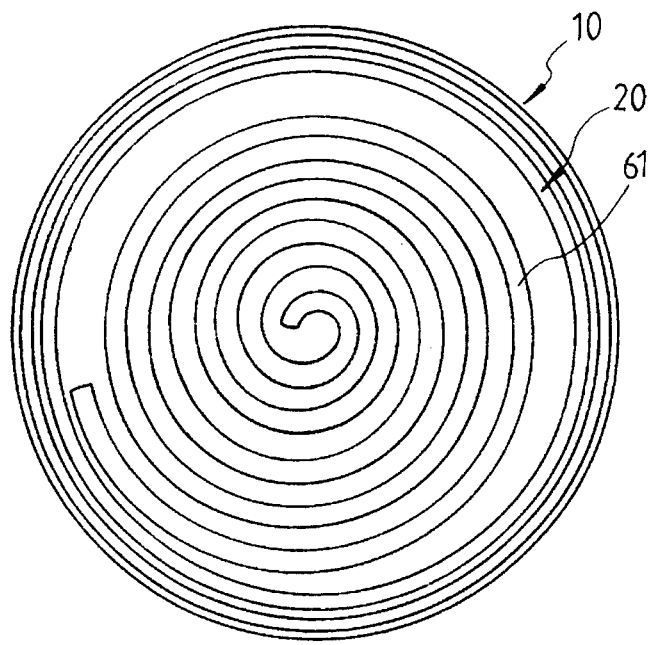
Figure 9D:
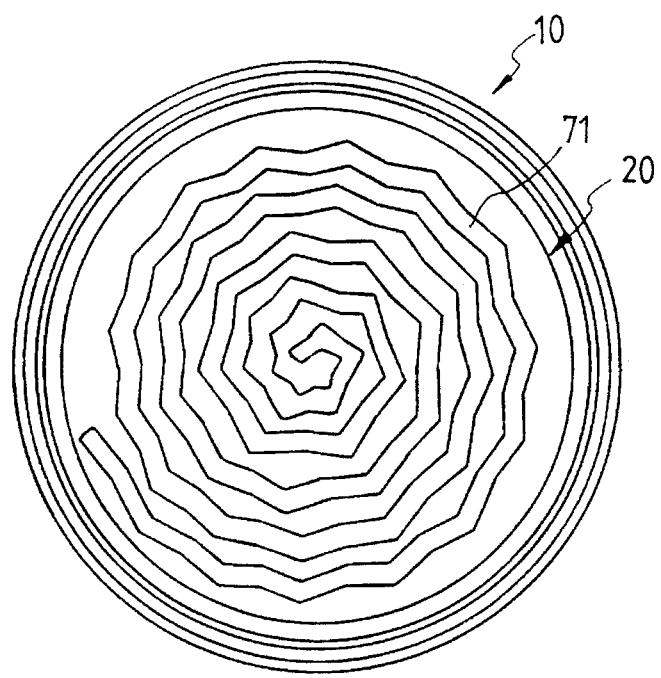

Turning to FIG. 9C or 9D, the reinforcing means of the cooking vessel 10 may comprise a spiral member 61 or 71. The spiral member 61 of FIG. 9C is a conventional spiral while the spiral member 71 of FIG. 9D is an angled spiral. In order to form the spiral member 61 or 71, a metal wire is spiraled in order to form a closed spiral member.

The honey type net member 50 and the spiral members 61 and 71 are inserted into their bottom plates 20 such that their bottom surfaces are leveled with the bottom surfaces of the plates 20. The insertion of the member 50, 61 or 71 into a corresponding bottom plate 20 is achieved by pressing as described for the primary embodiment. The above embodiments shown in FIGS. 7 to 9D yield the same or similar result as that described for the primary embodiment.

In the production method of the above stainless steel cooking vessel 10, the joining of the bottom plate 20 to the base bottom of the stainless steel vessel 10 may be achieved by a pressing device such as a friction press using instantaneous pressure. Alternatively, the joining of the bottom plate 20 to the base bottom of the stainless steel vessel 10 may be achieved by high-frequency heating using a solvent such as powder or flux.

Figure 5:
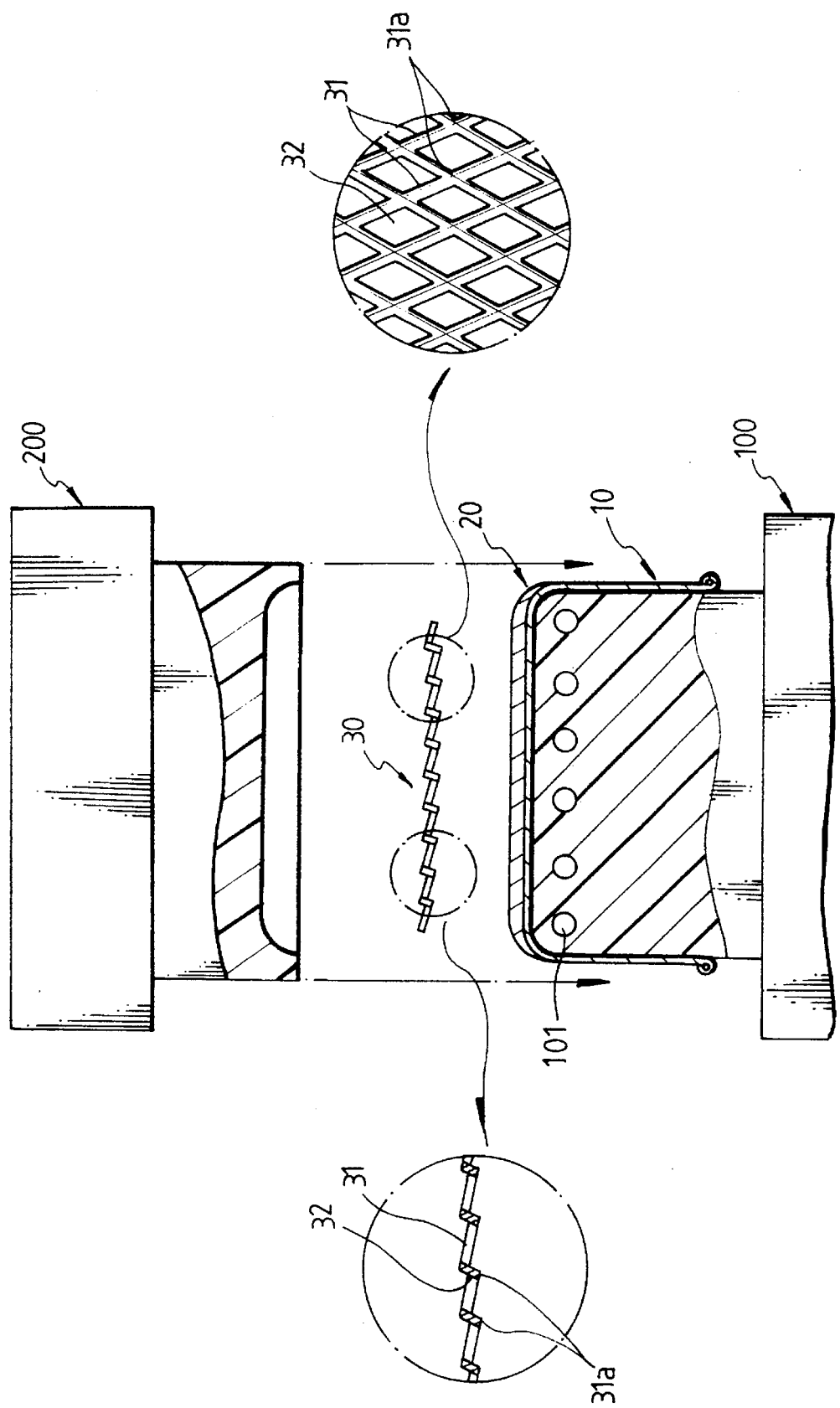

Thereafter, the stainless steel vessel 10 with the bottom plate 20 is turned over and laid on or fitted over a lower mold 100 of the friction press as shown in FIG. 5. The reinforcing means, for example, the net member 30 of the primary embodiment is laid on the bottom surface of the bottom plate 20. An upper mold 200 of the friction press is, thereafter, downed onto the lower mold 100 as shown in FIG. 6, thus to make the net member 30 eating into the bottom plate 20.

If described in detail, the stainless steel vessel 10 fitted over the lower mold 100 is preheated by a heater 101 of the lower mold 100 such that the bottom plate 20 jointed to the base bottom of the vessel 10 is preheated to temperatures ranged from 470° C. to 490° C. Thereafter, the net member 30 made of a ferrous metal or a nonferrous metal is laid on the bottom surface of the bottom plate 20. The upper mold 200 instantaneously presses down the net member 30 using instantaneous pressures ranged from 1000 to 1300 ton. As a result of the instantaneous pressing, the net member 30 eats into the preheated bottom plate 20 such that its peaks 31a are leveled with the bottom surface 20a of the plate 20. At this time, the material of the bottom plate 20 is plastically deformed and tightly fills up the diamond meshes 32 of the net member 30, thus to compress and tighten the net member 30 and to retain the net member 30 in its place in the plate 20.

In the above pressing, the instantaneous pressure of the upper mold 200 causes the peaks 31a of the member 30 to slantly eat into the bottom plate 20 which has been preheated and somewhat loosened in its structure. Hence, the material of the bottom plate 20 is plastically deformed and tightly fills up the diamond meshes 32 of the net member 30, thus to compress and tighten the net member 30 and to retain the member 30 in its place in the plate 20. In this case, the peaks 31a of the net member 30 is leveled with the bottom surface 20a of the plate 20 formed by the copper, copper alloy, aluminum or aluminum alloy tightly filling up the meshes 32.

Since the peaks 31a of the member 30 slantly eat into the bottom plate 20 by the instantaneous pressing as described above, the insertion of the net member 30 into the bottom plate 20 is easily carried out. In addition, with the copper, copper alloy, aluminum or aluminum alloy tightly filling up the meshes 32 of the net member 30, the net member 30 is tightly compressed in the plate 20. Thus, the plate 20 has a desired strong structure irrespective of the intrinsic frailness of its material. The net member 30 also gives uniform heat transfer performance to the bottom of the cooking vessel 10.

The cooking vessel 10 of this invention needs no additional cutting step in its production process. However, the production process of the cooking vessel 10 is ended by a simple finishing step for providing a good appearance for the vessel 10.

As described above, the present invention strengthens the structure of a bottom plate, which is joined to the outer bottom of a stainless steel cooking vessel and intrinsically frail in its structure due to its material, that is, copper, copper alloy, aluminum or aluminum alloy, by simple insertion of reinforcing means on the bottom plate. The reinforcing means is made of a ferrous metal or a nonferrous metal different from the material of the bottom plate. With the difference of heat conduction between the bottom plate and the reinforcing means made of different materials, the heat transfer rate, the heat conductivity and the heat preservation of the cooking vessel, particularly of the vessel bottom, are remarkably improved. In this regard, the cooking time as well as the fuel consumption of the cooking vessel is remarkably reduced, so that the cooking vessel achieves the recent trend of energy saving. With the reinforcing means, this cooking vessel is free from possible partial overheat, so that the food in the cooking vessel does not get partially scorched about and stick to the bottom of the cooking vessel. When the reinforcing means is magnetized, the cooking vessel can be used with an induction heater and this makes the cooking vessel having many uses. The bottom structure of the cooking vessel shows a good outer appearance when it is kept turned over. This good outer appearance of the vessel bottom improves value of the cooking vessel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooking vessel, comprising:

a stainless steel base body;

a bottom plate joined to an outer bottom of said stainless steel base body, said bottom plate being made of a material selected from the group of copper, copper alloy, aluminum and aluminum alloy; and reinforcing means added to said bottom plate for improving not only structural strength of said bottom plate, but also heat transfer rate, heat conductivity and heat preservation of a bottom portion of the vessel, said reinforcing means having a heat conduction different from that of the material of said bottom plate, and being inserted in said bottom plate such that bottom of said reinforcing means is level with a bottom surface of said bottom plate; and wherein said reinforcing means is a net member formed by a plurality of jagged ribs crossing each other, peaks of said jagged ribs being level with the bottom surface of the bottom plate when said net member is inserted in the bottom plate, said bottom surface of the bottom plate being formed by the material of the bottom plate filling up meshes of said net member when the net member is inserted in the bottom plate.

2. The cooking vessel according to claim 1, wherein said reinforcing means is made of a stainless steel.

3. The cooking vessel according to claim 1, wherein said reinforcing means is made of a magnetized metal.

4. A cooking vessel, comprising:

a stainless steel base body;

a bottom plate joined to an outer bottom of said stainless steel base body, said bottom plate being made of a material selected from the group of aluminum and aluminum alloy; and reinforcing means added to said bottom plate for improving not only structural strength of said bottom plate, but also heat transfer rate, heat conductivity and heat preservation of a bottom portion of the vessel, said reinforcing means having a heat conduction different from that of the material of said bottom plate, and being inserted in said bottom plate such that a bottom of said reinforcing means is level with a bottom surface of said bottom plate; and wherein said reinforcing means is a net member formed by a plurality of jagged ribs crossing each other, peaks of said jagged ribs being level with the bottom surface of the bottom plate when said net member is inserted in the bottom plate, said bottom surface of the bottom plate being formed by the material of the bottom plate filling up meshes of said net member when the net member is inserted in the bottom plate.

5. The cooking vessel according to claim 4, wherein said reinforcing means is made of copper showing a high heat conductivity.

* * * * *